(12) United States Patent
Parikh et al.

(10) Patent No.: US 10,698,882 B2
(45) Date of Patent: Jun. 30, 2020

(54) DATA COMPARTMENTS FOR READ/WRITE ACTIVITY IN A STANDBY DATABASE

(71) Applicant: International Business Machines Corporation, Armonk, NY (US)

(72) Inventors: Viren D. Parikh, Bangalore (IN); Ramesh C. Pathak, Bangalore (IN); Suryanarayana K. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 15/461,688

(22) Filed: Mar. 17, 2017

(65) Prior Publication Data

US 2018/0268017 A1   Sep. 20, 2018

(51) Int. Cl.
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
CPC .. G06F 16/2365; G06F 16/27; G06F 11/1469; G06F 11/2071; G06F 11/2082
USPC ........................................................ 707/634
See application file for complete search history.

(56) References Cited

U.S. PATENT DOCUMENTS

| | | | | |
|---|---|---|---|---|
| 8,060,889 | B2 * | 11/2011 | Sim-Tang | G06F 16/2358 719/318 |
| 2006/0200497 | A1 * | 9/2006 | Hu | G06F 11/1471 |
| 2008/0222159 | A1 * | 9/2008 | Aranha | G06F 16/21 |
| 2008/0271019 | A1 * | 10/2008 | Stratton | G06F 21/577 718/1 |
| 2014/0172803 | A1 * | 6/2014 | Diaconu | G06F 16/128 707/649 |
| 2015/0046668 | A1 | 2/2015 | Hyde et al. | |
| 2015/0120659 | A1 * | 4/2015 | Srivastava | G06F 16/27 707/625 |
| 2015/0143164 | A1 | 5/2015 | Veerla et al. | |
| 2016/0154709 | A1 * | 6/2016 | Mitkar | G06F 11/1464 707/649 |
| 2016/0179867 | A1 * | 6/2016 | Li | G06F 11/1435 707/634 |
| 2017/0351584 | A1 * | 12/2017 | Griffith | G06F 11/1471 |
| 2018/0121511 | A1 * | 5/2018 | Li | G06F 16/2358 |
| 2018/0239677 | A1 * | 8/2018 | Chen | G06F 11/203 |

* cited by examiner

*Primary Examiner* — James Trujillo
*Assistant Examiner* — Jessica N Le
(74) *Attorney, Agent, or Firm* — Schmeiser, Olsen & Watts, LLP; Mark Vallone

(57) ABSTRACT

A method for creating a standby database with read/write access capability while also maintaining a data consistency with a primary database, is provided. The method includes syncing the primary database with a physical standby mirror existing on the standby database, creating a first data compartment and a second data compartment on the standby database, separate from the physical standby mirror, applying a change made to the first data object on the primary database to the corresponding first data object on the physical standby mirror; and determining whether the change should be applied to the corresponding first data object stored on the first data compartment in accordance with data merge rules associated with the first data compartment and the second data compartment.

20 Claims, 9 Drawing Sheets

US 10,698,882 B2

DATA COMPARTMENTS FOR READ/WRITE ACTIVITY IN A STANDBY DATABASE

TECHNICAL FIELD

The present invention relates to systems and method for providing an active read-writable standby database while preserving data consistency with a primary database, and more specifically to embodiments of data compartment for read/write activity in a standby database.

BACKGROUND

Current standby databases are used to support read/write activity performed on primary databases, and are designed for read-only activity for disaster recovery purposes.

SUMMARY

An aspect of this invention relates to a method, and associated computer system and computer program product, for creating a standby database with read/write access capability while also maintaining a data consistency with a primary database. A processor of a computing system syncs the primary database with a physical standby mirror existing on the standby database, wherein a first data object and a second data object written to the primary database from a live application is synced in a read only access on the physical standby mirror. A first data compartment and a second data compartment are created on the standby database, separate from the physical standby mirror. A change made to the first data object on the primary database is applied to the corresponding first data object on the physical standby mirror. The processor determines that (i) the change should be applied to the corresponding first data object stored on the first data compartment in accordance with data merge rules associated with the first data compartment to keep the data stored on the first data compartment updated in real-time and in sync with the physical standby mirror, and (ii) the change should not be applied to the corresponding first data object stored on the second data compartment in accordance with data merge rules associated with the second data compartment.

The foregoing and other features of construction and operation will be more readily understood and fully appreciated from the following detailed disclosure, taken in conjunction with accompanying drawings.

DETAILED DESCRIPTION

Figure 1:
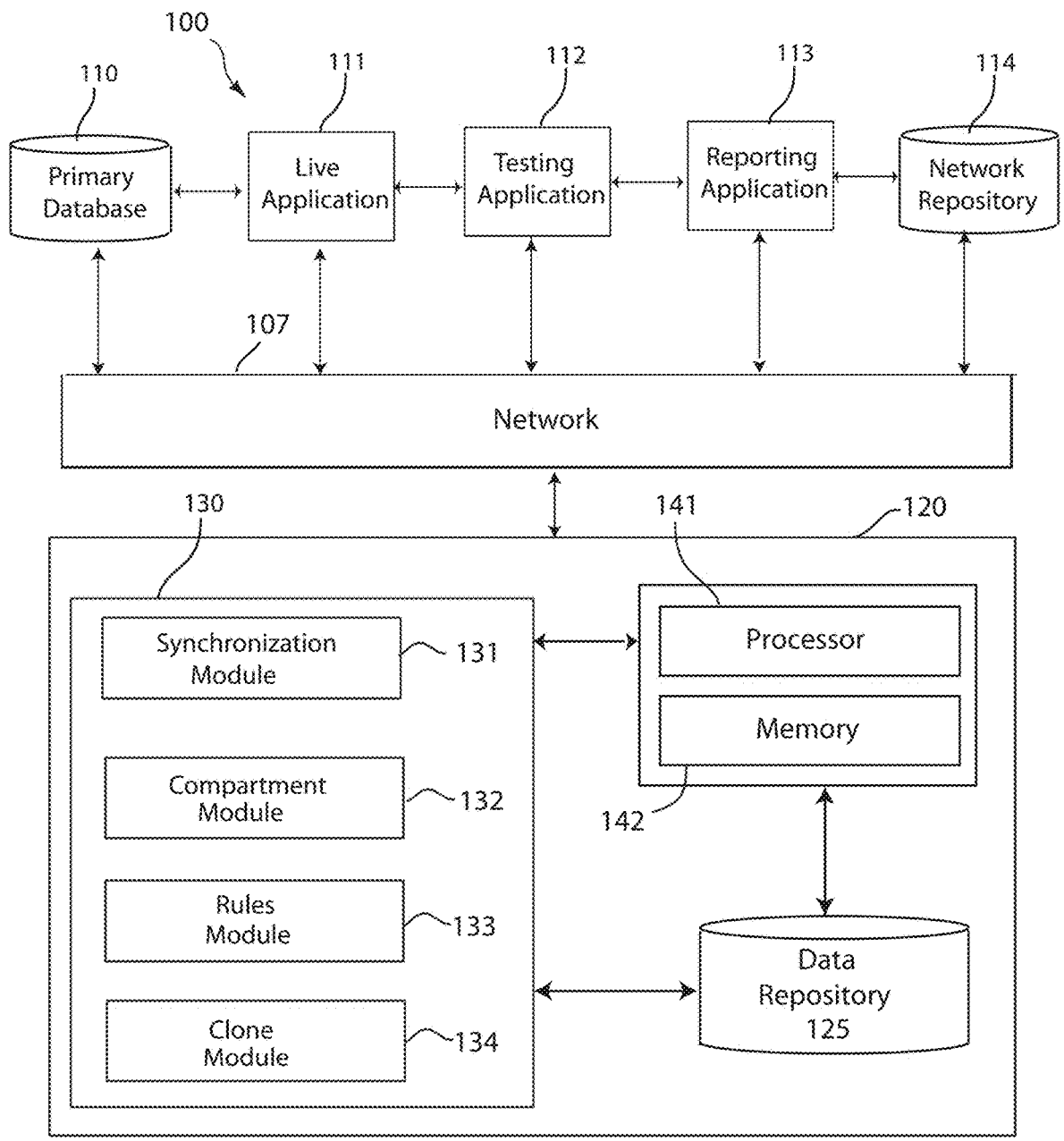
FIG. 1 depicts a block diagram of an active read-writable standby database server system, in accordance with embodiments of the present invention.

Current state of art pertaining to standby databases supports read-write activity to be performed on primary databases with read-only activity being allowed on standby databases. Read-write activity is not currently supported on standby databases due to the technical and design challenges of implementing such a solution. Standby databases may be ideal candidates to be used as reporting databases to offload reporting from the primary instances. Most off-the-shelf reporting tools, such as Microstrategy®, etc. need read-write access to the database to create temporary, staging tables to perform aggregations and sorting at the database layer before presenting the results to the end user layer. In addition, building pre-production databases from production data from databases growing to the order of hundreds of terabytes can be challenging. Current standby databases employing a read-only activity cannot: (a) build pre-production databases from production data; (b) perform incremental application tests on the pre-production data which change the table structures and/or the data; (c) continue to receive incremental updates while the pre-production data is being refreshed incrementally from production data; and (d) perform real-time switching back and forth from multiple versions of production and pre-production data. Further, the above-identified limitations render most off-the-shelf reporting tools practically useless in conventional standby database environments. Thus, a need exists for standby databases that can used for read-write activity simultaneously with the primary database.

Embodiments of the present invention relates to a system and method for delivering standby databases as compartmental instances that are available for read and write activity, thus enabling reporting tools, analytical tools, and application test cycles to run against real-time 'live' production data on the standby databases. Moreover, embodiments of the system and method of the present invention provides methods to drastically eliminate turnaround times associated with refreshing pre-production and test databases with production data in real-time.

Embodiments of the system and method may allow standby database instances (e.g. via compartments) to be opened in read-write mode in addition to maintaining the data consistency with the primary database(s), which may allow a standby database to work seamlessly with off-the-shelf reporting tools, as well as perform data warehousing aggregations and cube creations on the standby databases while still retaining the data consistency with the primary database. Embodiments of the standby database of the present system may meet the standby database's real point objective (RPO) and real time objective (RTO) objectives for disaster recovery purposes, but may also ensure that the disaster recovery capacity is being used while taking full advantage of the fact that the data is closely in sync (e.g. as close as real-time) with the primary database. Additionally, embodiments of the standby database server can also provide multiple compartments of data where different reporting or predictive, modelling, and/or data warehousing applications can run against the a compartment's data while still being kept up to date with the latest production data changes.

A few advantages provided by embodiments of the present invention include an ability to quickly clone multiple instances from an existing compartment or the main physical standby mirror (PSM) instance which may allow for real-time setup of instances for reporting and application testing purposes. Reporting applications can run on real-time data without expending resources on the 'Active' instance which is used for production operational purposes, which may allow off-the-shelf reporting applications to create temporary database objects in the compartmental instances on the standby database server while using real time "live" data for building reports. Application testing cycles can be repeated as often and as frequently as required because reading data blocks from the standby database can be done instantaneously by cloning/refreshing a compartment from the main PSM or a static PSM, in addition to a cloned compartment of the standby database. The ability to build/clone instantaneous compartments on request using a 'Fast Clone Refresh' mechanism, as described in greater detail infra. A mirror image of a standby PSM instance in addition to multiple "divergent" compartmental instances may be simultaneously maintained. Further, failover from production to standby is close to instantaneous because of the "static" mirrored compartments that can co-exist with divergent compartments.

Referring to the drawings, FIG. 1 depicts a block diagram of an active read-writable standby database server system 100, in accordance with embodiments of the present invention. Embodiments of an active read-writable standby database server system 100 may be described as a standby database server system that allows for read-write activity on portions of the standby database server, while also providing a satisfactory backup for the primary database.

Embodiments of the active read-writable standby database server system 100 may include a primary database 110. Embodiments of the primary database 110 may be one or more databases associated with live application 111 for storing data objects. The primary database 110 may include read-write activity, such that users using a live application 111 may directly save to the primary database, which may store data associated with one or more live applications 111. Embodiments of a live application 111 may be a software application running on one or more computing devices, wherein application data from the live application 110 is stored on the primary database 110. Embodiments of the live application 110 may be associated with banking transactions, logistic applications, store applications, shopping applications, and the like, being used by users, such as customers, employees, and the like. For example, if the live application 110 is associated with a retailer, the primary database 110 may include data for store inventory, and when an item is sold, the primary database 110 may be updated to reflect the change (i.e. read-write capability). As in most cases, the primary database 110 holds critical information, and is constantly being updated. Due to the criticality of the information contained on the primary database 110, a conventional standby database is used as a backup to the primary database, but is afforded only read-only access. Further, reporting applications 113, which may be a software application running on one or more computing device, are used for creating data spreadsheets, tables, indexes, and the like, for data analytics. Typically, the reporting applications 113 create new data objects on the primary database 110 while preparing pre-production and production data for reports, which further consume processing resources of the primary database 110.

Moreover, embodiments of the primary database 110 and the applications 111, 112, 113 may be coupled to a computing system 120 over a network 107. In an alternative embodiment, the primary database 110 may be connected to computing system 120 via a data bus line. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computer system 120, primary database 110, and applications 111, 112, 113, a connection to one or more network accessible knowledge bases containing information of one or more users, network repositories 114 or other systems connected to the network 107 that may be considered nodes of the network 107. In some embodiments, where the computing system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging data sent by or received from the primary database 110 or applications 111, 112, 113 to generate both historical and predictive reports regarding a performance or capacity of computing system 120. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

Referring still to FIG. 1, embodiments of the computing system 120 may be one or more servers. Embodiments of the computing system 120 may include a standby database 130. Embodiments of the standby database system 130 may be one or more databases, and may include a synchronization module 131, a compartment module 132, a rules module 133, and a clone module 134. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device 142 of the computer system 120, which may be coupled to the standby database system 130. A module (whether hardware, software, or a combination thereof) may be designed to implement or execute one or more particular functions or routines.

Figure 2:
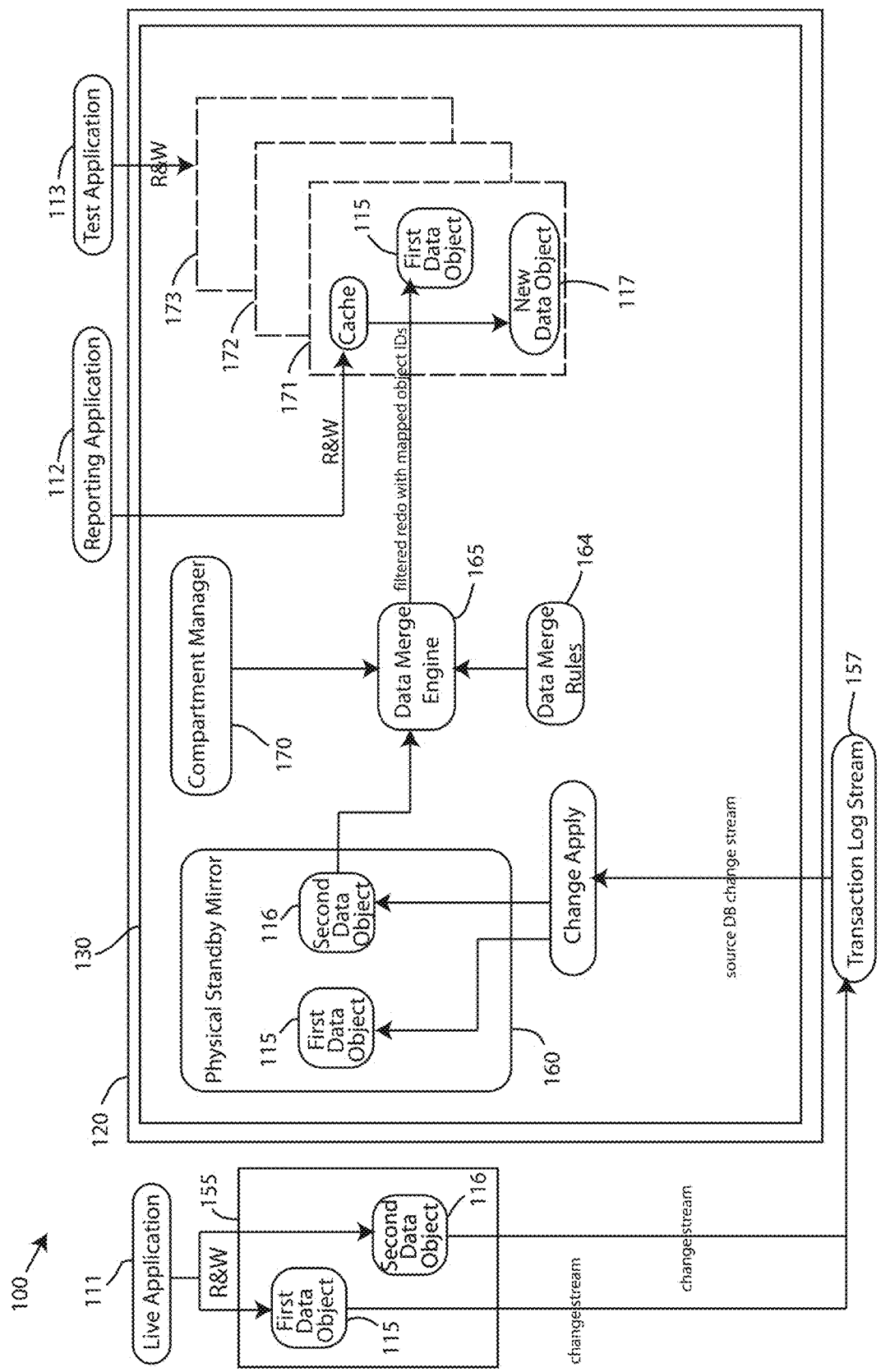
FIG. 2 depicts a more detailed block diagram of the active read-writable standby database server system of FIG. 1, in accordance with embodiment of the present invention.

FIG. 2 depicts a more detailed block diagram of the active read-writable standby database server system 100 of FIG. 1, in accordance with embodiment of the present invention. Embodiments of the computing system 120, as depicted in FIG. 2, may include the standby database system 130, which includes a physical standby mirror (PSM) 160. Embodiments of the synchronization module 131 of the standby database system 130 may include one or more components of hardware and/or software program code for syncing the primary database 110 with the PSM existing on the standby database. For instance, a first data object 115 and a second data object 116 may be written to the primary database 110 from a live application 111. In response to the first data object 115 and the second data object 116 being written to the primary database 110, the synchronization module 131 may sync or receive instructions to sync the first data object 115 and the second data object 116 in a read-only access on the PSM. Embodiments of the PSM 160 may exist on the standby database or a disaster recovery site, wherein the PSM 160 may be constructed and maintained with a block level consistency with the primary database 110. In an exemplary embodiment, the PSM 160 is not available for write usage. Moreover, embodiments of the synchronization module 131 may ensure that the data objects written to the primary database 110 are backed up and written in a read-only fashion to the PSM 160. Embodiments of the PSM 160 may then still allow the standby database system 130 to function as a disaster recovery database, meeting desired RPO and RTO.

If a change is made to the first data object 115 and/or the second data object 116, the synchronization module 131 may propagate the change to the corresponding data objects 115, 116 stored on the PSM 160, so that the data objects, even when changed, are in sync with the primary database 110 in a read-only access. For example, a transaction log stream 157, or redo stream, may capture, monitor, manage, etc. any changes made to the data objects 115, 116 on the primary database 110, by for example an end user using a live application 111. The PSM 160 may cooperate with the transaction log stream 157 to propagate the changes contained in the transaction log stream 157. Accordingly, the data objects of the PSM 160 mirror, in a real-time manner, the data objects present on the primary database 110.

Referring still to FIGS. 1-2, embodiments of the standby database system 130 of the computing system 120 may include a plurality of data compartments 171, 172, 173. The plurality of data compartments 171, 172, 173 may be created, initialized, utilized, and/or generated with read-write capability, separate from the PSM 160. Embodiments of the PSM 160 and the data compartments 171, 172, 173 may be located on the same server, or may be located on different servers, wherein the one or more servers including the PSM 160 and the data compartments 171, 172, 173 may form the computing system 120. Embodiments of the standby database system 130 may include a compartment module 132. Embodiments of the compartment module 132 of the standby database system 130 may include one or more components of hardware and/or software program code for utilizing, establishing, creating, initializing, and/or generating a first data compartment 171 and a second data compartment 172 or additional data compartments, such as data compartment 173 on the standby database, separate from the physical standby mirror 160. Embodiments of the data compartments 171, 172, 173 may be versioned compartments which are branched offshoots from the PSM 160. Embodiments of the compartment module 132 may create and/or generate any number of data compartments required by the system 100, and may be limited only to the scalability of the infrastructure, wherein an infrastructure housing the data compartments 171, 172, 173 can be either horizontally or vertically scalable. Moreover, embodiments of the data compartments 171, 172, 173 may have a read-write access/function such that other operations, such as reporting or testing functions, may be accomplished by accessing the plurality of data compartments 171, 172, 173, which saves processing power and resource bandwidth normally required of the primary database 110.

Furthermore, the data compartments 171, 172, 173 may include data objects from the PSM 160. For instance, the first data object 115 and the second data object 116 may be present on the first data compartment 171, the second data compartment 172, and a third data compartment 173, in a read-write accessibility. Embodiments of the compartment module 132 may communicate with a compartment manager 170 that may manage the data compartments 171, 172, 172 by keeping track of the number of data compartments utilized, as well as data objects stored thereon.

Embodiments of the standby database system 130 of computing system 120 may further include a rules module 133. Embodiments of the rules module 133 of the standby database system 130 may include one or more components of hardware and/or software program code for determining whether changes made to the first data object 115 and/or the second data object 116 on the primary database 110 should be applied, propagated, etc. to the data objects 115, 116 on the data compartments 171, 172, 173. As noted above, if a change is made to the data objects 115, 116 on the primary database by a user interfacing with live application 110, the change is captured by the transaction log stream 157 and ultimately the change is applied to the data objects 115, 116 on the PSM 160. However, embodiments of the rules module 133 may determine whether the changes to the data objects 115, 116 applied on the PSM 160 should be further applied to the data objects 115, 116 stored on the data compartments 171, 172, 173. In some cases, the change is applied to one of the data compartments 171 such that the data compartment 171 is kept in sync with the PSM 160. If the data compartment is kept in sync with the PSM 160, the data compartment 171 may be referred to as a static compartment. Embodiments of the static compartments may be created as read only compartments that are in sync with the PSM 160. If the data compartment, such as data compartment 172, is not to be kept in sync with the PSM 160, the data compartment 172 may be referred to as a divergent compartment. Embodiments of the divergent compartment may be data compartments available for read-mite, and have data that has diverged from the PSM 160 over a period of time.

Embodiments of the rules module 133 may communicate with a data merge engine 165, which may include/provide data merge rules and/or logic regarding an operation of the data compartment. For instance, the rules module 133 in cooperation with the data merge engine 165 may determine whether a data compartment 171, 172, 173 is static or divergent. The determination by the rules module 133 by consulting the data merge rules generated by the data merge engine 165 may allow a determination, for each data compartment, of whether a change to the data objects 115, 116 on the PSM 160 should be applied to the data objects 115, 116 located on the data compartments 115, 116.

In addition to, or as an alternative to a yes/no determination of whether the data compartments 171, 172, 173 should ever be updated with changes made to the data objects of the PSM 160, the rules module 133 may further determine that some changes to the PSM 160 should be applied to a particular data compartment, while that same change should not be applied to another data compartments, in accordance with data merge rules associated with each data compartment 171, 172, 173. Similarly, some data compartments 171, 172, 173 may include read-write access, and apply some changes made to the PSM 160, but not necessarily all of the changes to the PSM 160. The determination may be made in accordance with the data merge rules associated with each data compartment by analyzing a redo/change stream associated with each data compartment 171, 172, 173. For instance, the data merge rules of the data merge engine 165 may provide that some data objects on the first data compartment 171 should be kept in sync with the PSM 160, while other data objects should not. Each data compartment 171, 172, 173 has data merge rules that specify where and which objects, tablespaces, schemas, etc. can be excluded/included from being synchronized with the PSM 160. For every redo change applied in the PSM 160, the data merge engine 165 may filter out one or more exclusions from a main redo stream, which may produce a customized redo stream to each data compartment 171, 172, 173. In an exemplary embodiment, internally within each data compartment 171, 172, 173, the redo stream may be dequeued in sequential order, and object identifiers remapped. For example, one stream of redo changes from the PSM 160 which pertains to read-only objects is applied at the block level to the target compartment, which may be a static data compartment, while a second stream of redo changes pertaining to the excluded objects applied by converting the redo stream into logical SQL statements, may be applied at the block level to a target data compartment, depending on the data merge rules specified for the particular data compartment. Further, each data compartment 171, 172, 173 may generate a stream of redo/changes, wherein the data compartment 171, 172, 173 can be completely recovered to any point in time using the data compartment's redo stream.

Accordingly, the active read-writable standby database server system 100 may provide flexibility over current read only standby database solutions. The system 100 may include a plurality of data compartments, wherein some data compartments may be completely static (i.e. in sync with the PSM 160 and read only) and other data compartments may be divergent data compartments, with data merge rules specific to each data compartment 171, 172, 173 (i.e. read-write data compartments that may or may not apply a change made to the PSM from the redo stream based on associated data merge rules.

With continued reference to FIG. 2, embodiments of the computing system 120 having standby database system 130 may allow for a reporting application 113 to create a new data object 117 on a read-write data compartment, such as data compartment 171. Most off-the-shelf reporting tools require the need to create a new data object (e.g. data table, index, etc.) to prepare a data production report for an end user. In an exemplary embodiment, the reporting application 113 may access the first data compartment 171, or any read-write data compartment, and write to the data compartment for purposes of preparing a report for an end user operating the reporting application 113 on the end user's computing device. Therefore, reporting application(s) 113 may be pointed against such read and write data compartments to have access to real-time and current data along with the ability to create temporary reporting objects, such as new data object 117. For example, the reporting application 113 may access the first data compartment 171, which may include a data object 115 that is updated in real-time from the PSM 160 that mirrors the primary database 110. Data object 115, and other data objects, may be utilized by the reporting application 113 to create new, temporary data object 117 on the first data compartment, which is a part of the standby database, and not the primary database 110. Accordingly, the active read-writable standby database server system 100 allows for creation of production data reports to be created using resources of the standby database, thereby offloading work from the primary database 110 to save primary database processing power and resources. Further, a data compartment 171, 172, 173 can be refreshed any time from the compartment's parent PSM 160, while the rest of the data compartments are functioning independently, which may allow refresh operations to complete seamlessly, and for reporting and test applications 112, 113 to access the "earlier" image/compartment right up to the time when the new image refresh has taken place. Thus, down time for reporting and testing applications and access to data is drastically reduced.

Figure 3:
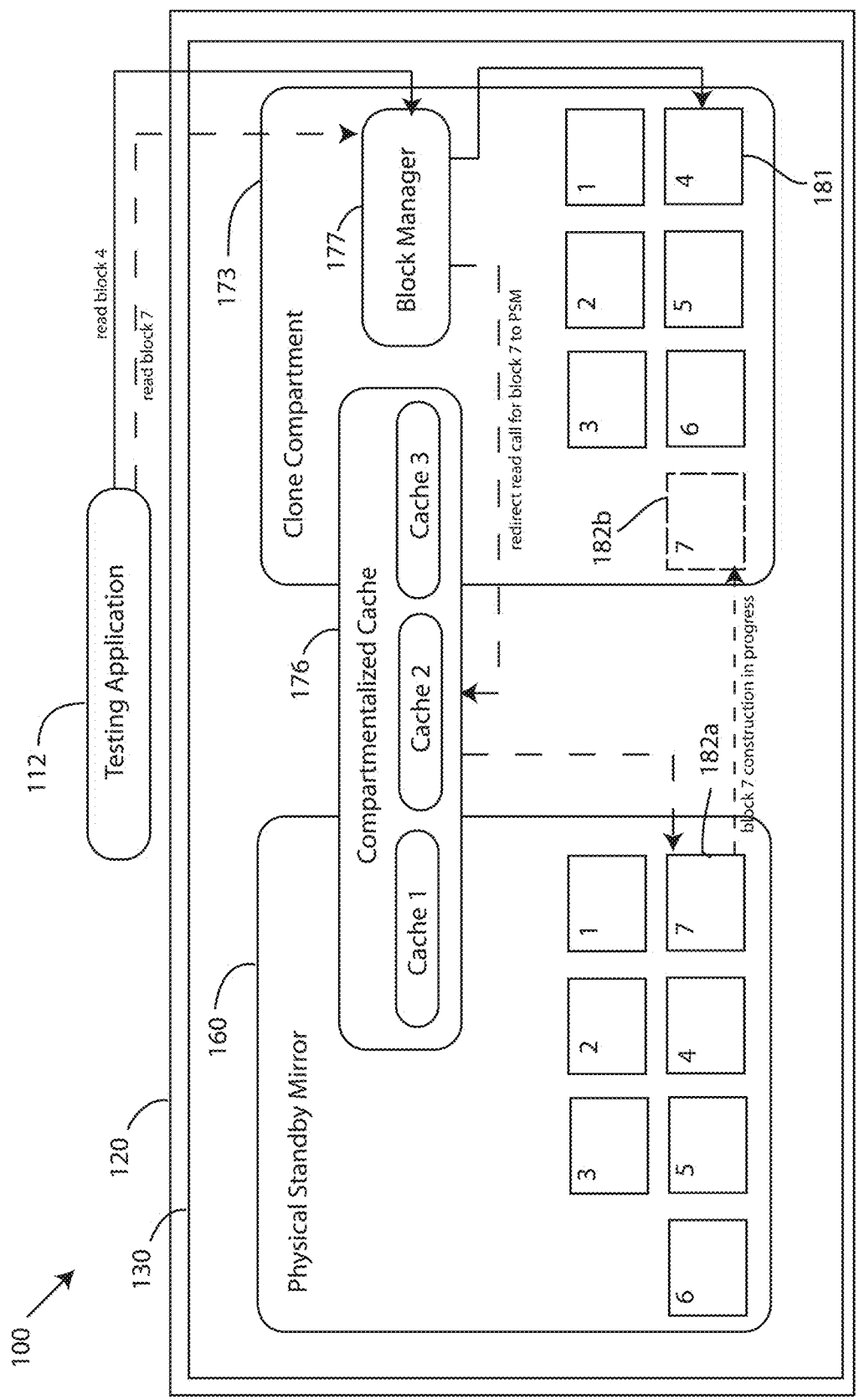
FIG. 3 depicts a block diagram of the active read-writable standby database server system during a cloning process, in accordance with embodiments of the present invention.

Referring back to FIG. 1, embodiments of the standby database system 130 of the computing system 120 may include a clone module 134. Embodiments of the clone module 134 may include one or more components of hardware and/or software program code for cloning a plurality of data objects to a third data compartment 173, in response to a request by a testing application 112 to perform a cloning process. Embodiments of the a testing application 112 or test application may be a software application running on a computing device, wherein an end user may utilize the testing application 112 to perform various tasks, such as a test to the system 100, cloning of one or more portions of the standby database for testing purposes, and the like. FIG. 3 depicts a block diagram of the active read-writable standby database server system 100 during a cloning process, in accordance with embodiments of the present invention. Testing application 112 may read a target data object from the third data compartment 173 if the target data object has been successfully cloned on the third data compartment 173, and reads the target data object from the physical standby mirror 160 if the target data object has yet to be successfully cloned to the third data compartment 173. As an example, testing application 112 may initiate a cloning process such that data stored on the standby database may be cloned to a new clone compartment, such as data compartment 173. In response to receiving a request to clone data, the clone module 134 may invoke a command to create a new compartment, such as a third data compartment 173, from the PSM 160. At different times in the cloning process, some data blocks may have already been cloned to the new clone compartment 173, such as data block 181, while the construction of other blocks to clone compartment 173 are still in progress, such as data block 182*b*. Data blocks located on the PSM 160 may be depicted as block 182*a*. As an example of the cloning process, which may be referred to a fast clone refresh method, testing application 112 may access data compartment 173 to read data block #4. The request to read data block #4 may be received by block manager 177, which may manage and/or process requests to read data blocks present on the data compartment 173. The block manager 177 determines that block #4 has already been successfully cloned to the new compartment 173, and allows the testing application 112 to read data block #4. The testing application 112 may likewise requests to read data block #7 from the clone compartment 173. The block manager 177 may determine that data block #7 has not yet been cloned to the clone compartment 173, and may redirect the request to read data block #7 to the PSM 160, so that the data block #7 can be read by the testing application 112 without waiting for the block #7 to be created on the clone compartment 173. The redirect may first be made to the compartmentalized cache 176, which is a memory structure, in an attempt to read data block #7 from cache. If the data block #7 cannot be read from the compartmentalized cache 176, then the request may be redirected to the PSM 160, which includes data block #7.

Furthermore, the entire cloning process may be instantaneous. While the clone compartments data blocks are being populated, embodiments of the clone module 134 may read the corresponding blocks from the PSM 160, which allows for application testing to start with almost no turnaround time. If any changes are made to the blocks during the testing and while the new compartment 173 is being built, the new/changed blocks may directly be written into the compartment 173. If one of the compartments needs to become the "active" instance, the clone module 134 may point the application 112 to the compartment instance. Further, a single PSM 160 can have multiple compartmental instances registered to the PSM 160. Each PSM 160 may have one main listener which may accept connections to either the main PSM 160 or the inherited compartmental instances. Applications or user sessions connecting to compartments may do so by specifying the host name, port name, PSM (Instance name) as the Compartment name. Multiple clone compartments can be created from any of the existing data compartments or from the PSM 160.

Referring still to FIG. 1, embodiments of the computer system 120 may be equipped with a memory device 142 which may store information/data, reports, and a processor 141 for implementing the tasks associated with the active read-writable standby database server system 100.

Figure 4:
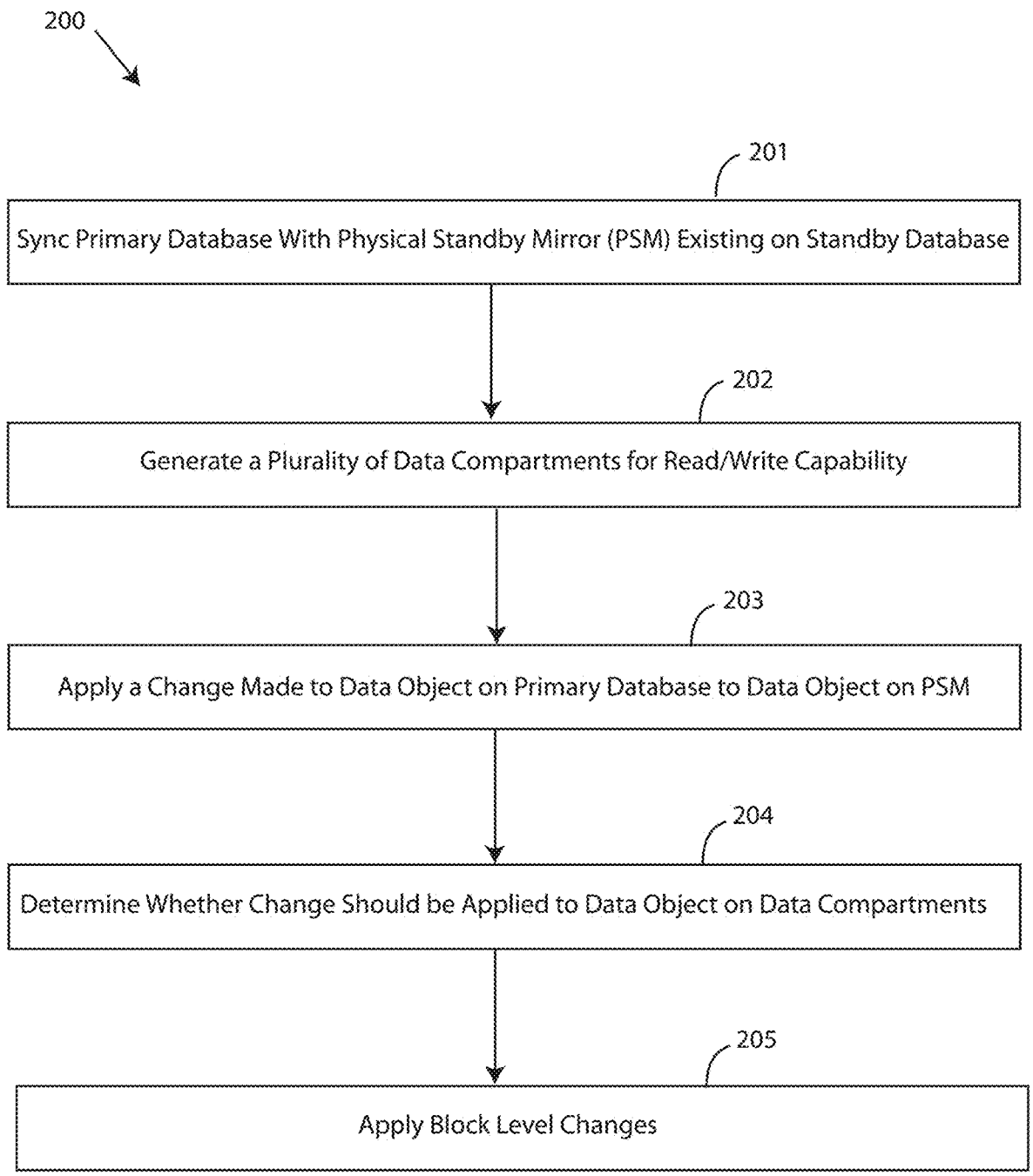
FIG. 4 depicts a flowchart of a method for creating a standby database with read/write access capability while also maintaining a data consistency with a primary database, in accordance with embodiments of the present invention.

With continued reference to the drawings, FIG. 4 depicts a flowchart of a method 200 for creating a standby database with read/write access capability while also maintaining a data consistency with a primary database, in accordance with embodiments of the present invention. One embodiment of a method 200 or algorithm that may be implemented for creating a standby database with read/write access capability while also maintaining a data consistency with a primary database in accordance with the active read-writable standby database server system 100 described in FIGS. 1-3 using one or more computer systems as defined generically in FIG. 7 below, and more specifically by the specific embodiments of FIGS. 1-3.

Embodiments of the method 200 for creating a standby database with read/write access capability while also maintaining a data consistency with a primary database may begin at step 201 wherein the PSM 160 is synced with the primary database 110. Step 202 creates one or more data compartments 171, 172, 172, wherein some or all of the data compartments 171, 172, 173 may include a read-write capability. Step 203 applies a change made to a data object on the primary database 110 to a corresponding data object on the PSM 160, which may maintain a data consistency with the primary database. The change applied to the PSM 160 to capture the change to the primary database 110 may be done so as a read only access. Step 204 determines whether the change should be applied to the corresponding data objects on the one or more data compartments 171, 172, 173. Step 305 applies a block level change to the data object to the data compartments, in accordance with data merge rules associated with the data compartments 171, 172, 173.

Figure 5:
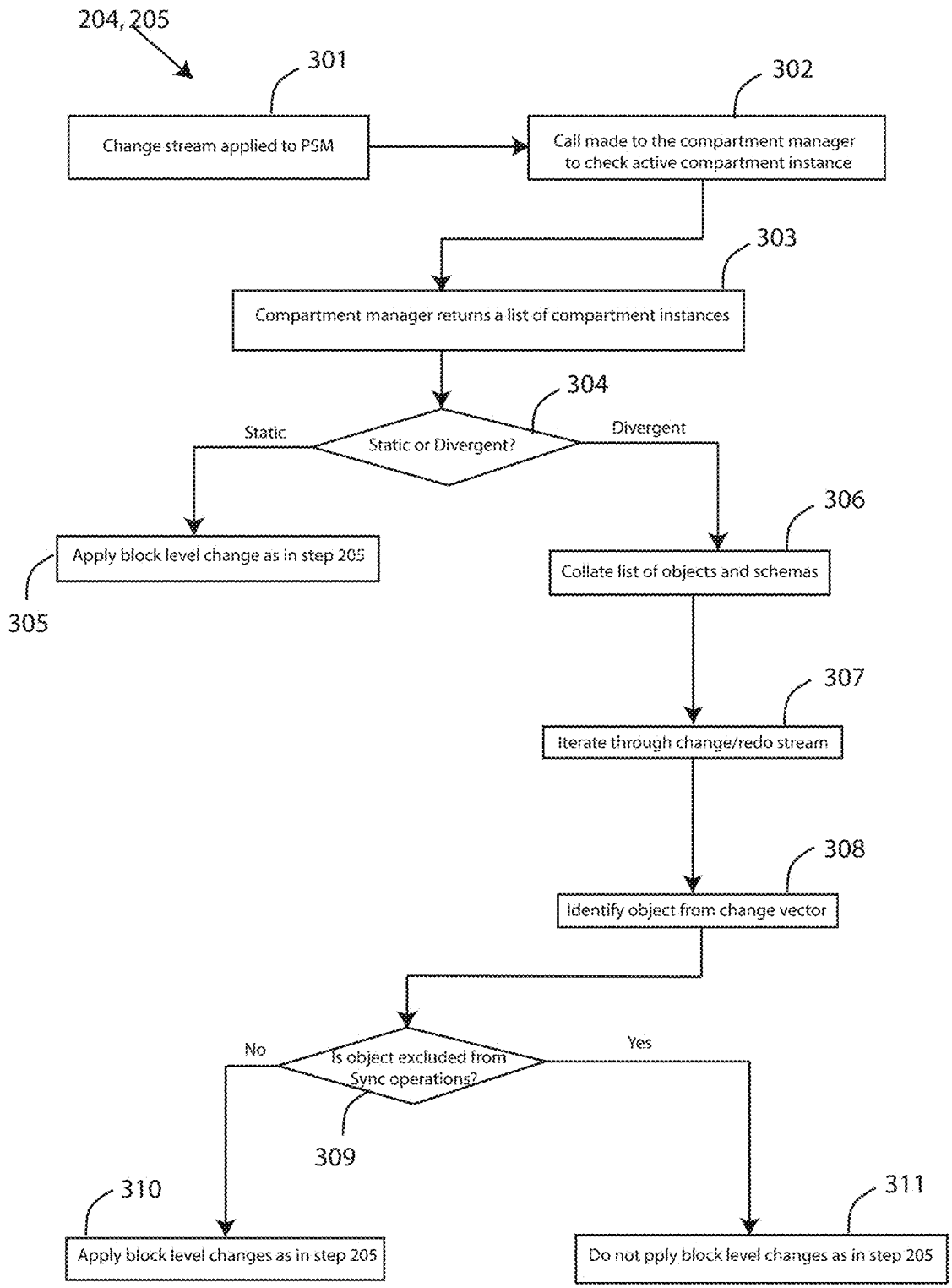
FIG. 5 depicts a flowchart of a step of the method of FIG. 4, in accordance with embodiments of the present invention.

FIG. 5 depicts a flowchart of a step 204, 205 of the method of FIG. 4, in accordance with embodiments of the present invention. At step 301, the change stream has been applied to the PSM 160 so that the PSM 160 is current and up-to-date with the primary database 110. At step 302, a call is made to the compartment manager 170 to determine whether any data compartments 171, 172, 173 have been created. Step 303 returns a list of active data compartments 171, 172, 173. Step 304 determines whether a target active data compartment included in the list returned by the compartment manager 170 is static or divergent. If the active data compartment is static, step 305 applies the block level change to the data object in the target data compartment. If the target data compartment is divergent, then step 306 collates a list of data objects and schemas, step 307 iterates through the redo/change stream associated with the target data compartment, and step 308 identifies data object from a change vector. Step 309 determines whether the data object is excluding from sync operations, in accordance with the data merge rules associated with the target data compartment. If the object is not excluded from sync operations, then step 310 applies the block level changes to the data object in the target data compartment. If the object is excluded from sync operations, then step 311 decides that the change to the data object of the target compartment will not be applied.

Figure 6:
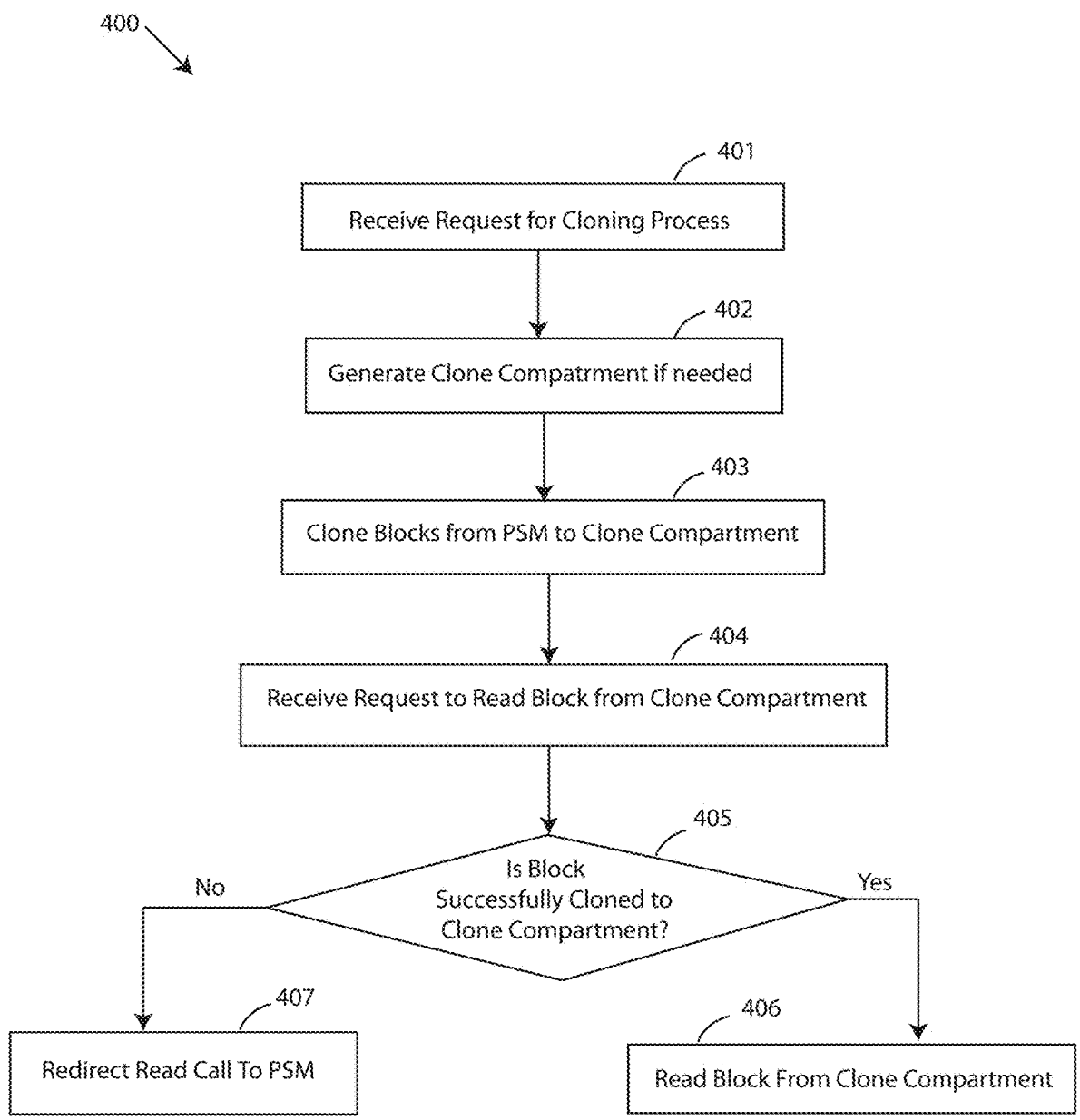
FIG. 6 depicts a flowchart of a cloning method using the active read-writable standby database server system of FIG. 3, in accordance with embodiments of the present invention.

FIG. 6 depicts a flowchart of a cloning method 400 using the active read-writable standby database server system 100 of FIG. 3, in accordance with embodiments of the present invention. The fast clone fresh method 400 may begin at step 401, which receives a request for a new compartment to be built for the cloning of data on the PSM 160, or potentially from another data compartment already active. In response to receiving the request, for example, from a testing application 112, step 402 may create a new compartment for the cloned data. Step 403 begins cloning the data blocks from the PSM 160 or the other active compartment to the new clone compartment 173. Step 404 receives a request to read a data block from the clone compartment 173. For instance, a testing application 112 may, during the cloning process, request to read a particular data block on the clone compartment 173. Step 405 determines whether the particular data block is successfully clones to the clone compartment 173. If the particular data block has been cloned and is present on the clone compartment 173, step 406 reads the data block from the clone compartment 173. If the particular data block has not been cloned (e.g. construction of data block to clone compartment in progress), step 407 redirects the read call to the PSM 160 so that the data block is read from the PSM 160, or from a compartmentalized cache 177.

Figure 7:
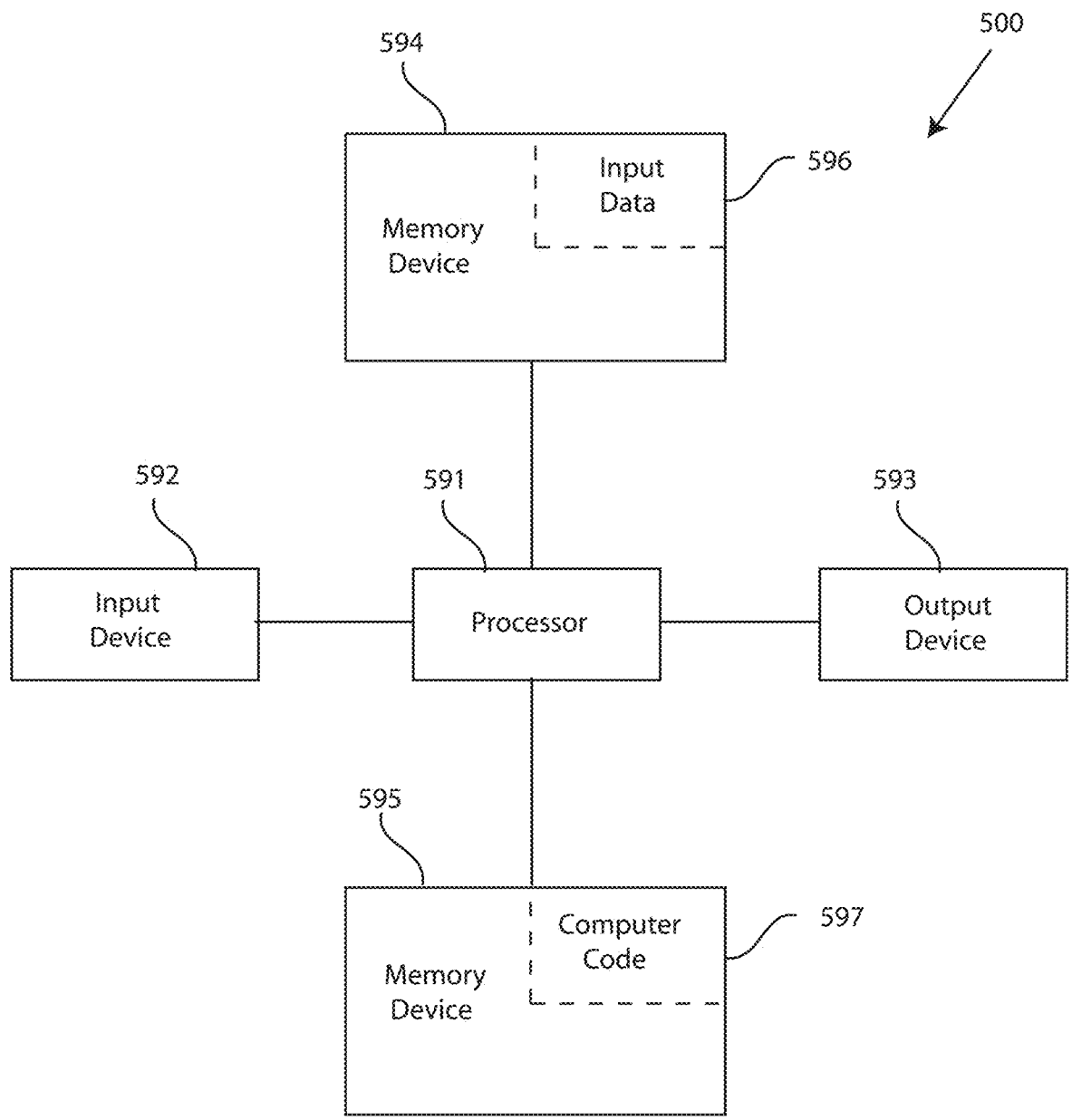
FIG. 7 depicts a block diagram of a computer system for the active read-writable standby database server system of FIG. 1, capable of implementing methods for creating a standby database with read/write access capability while also maintaining a data consistency with a primary database of FIGS. 4-6, in accordance with embodiments of the present invention.

FIG. 7 depicts a block diagram of a computer system for the active read-writable standby database server system of FIG. 1, capable of implementing methods for creating a standby database with read/write access capability while also maintaining a data consistency with a primary database of FIGS. 4-6, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing method for creating a standby database with read/write access capability while also maintaining a data consistency with a primary database, in the manner prescribed by the embodiments of FIGS. 4-6 using the active read-writable standby database server system of FIGS. 1-3, wherein the instructions of the computer code 597 may be executed by processor 591 via memory device 595. The computer code 597 may include software or program instructions that may implement one or more algorithms for implementing the methods for creating a standby database with read/write access capability while also maintaining a data consistency with a primary database, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to active read-writable standby database systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide an active read-writable standby database server system for creating a standby database with read/write access capability while also maintaining a data consistency with a primary database. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for creating a standby database with read/write access capability while also maintaining a data consistency with a primary database. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for creating a standby database with read/write access capability while also maintaining a data consistency with a primary database.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models areas follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
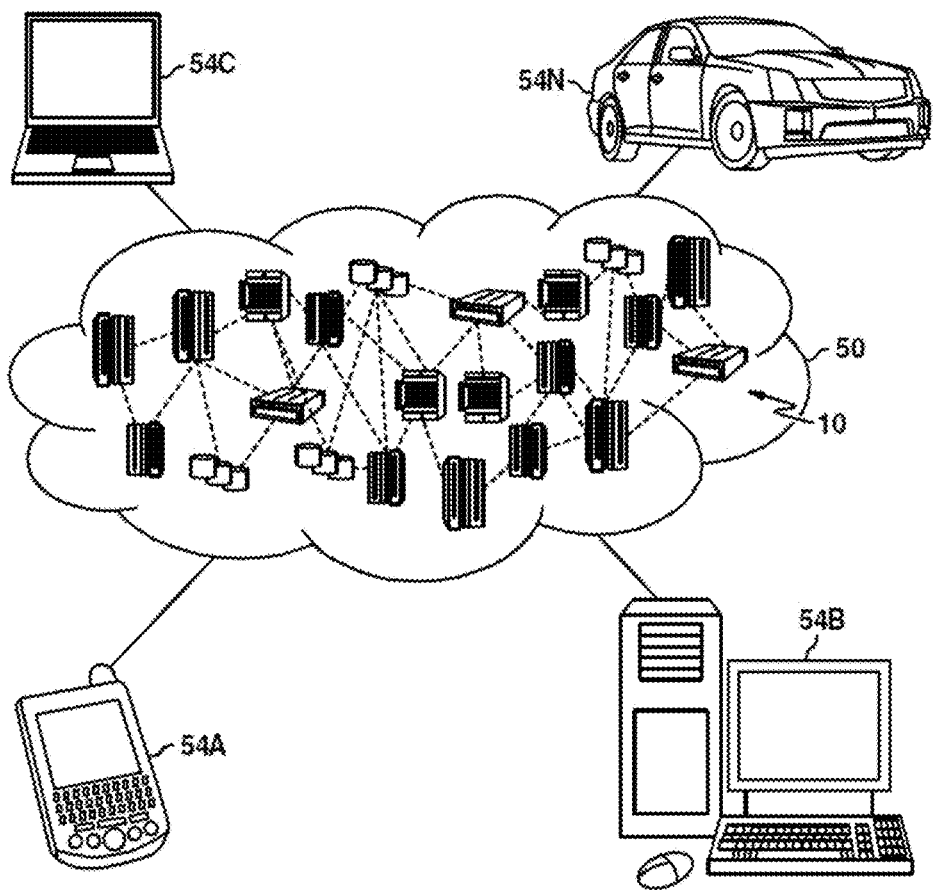
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
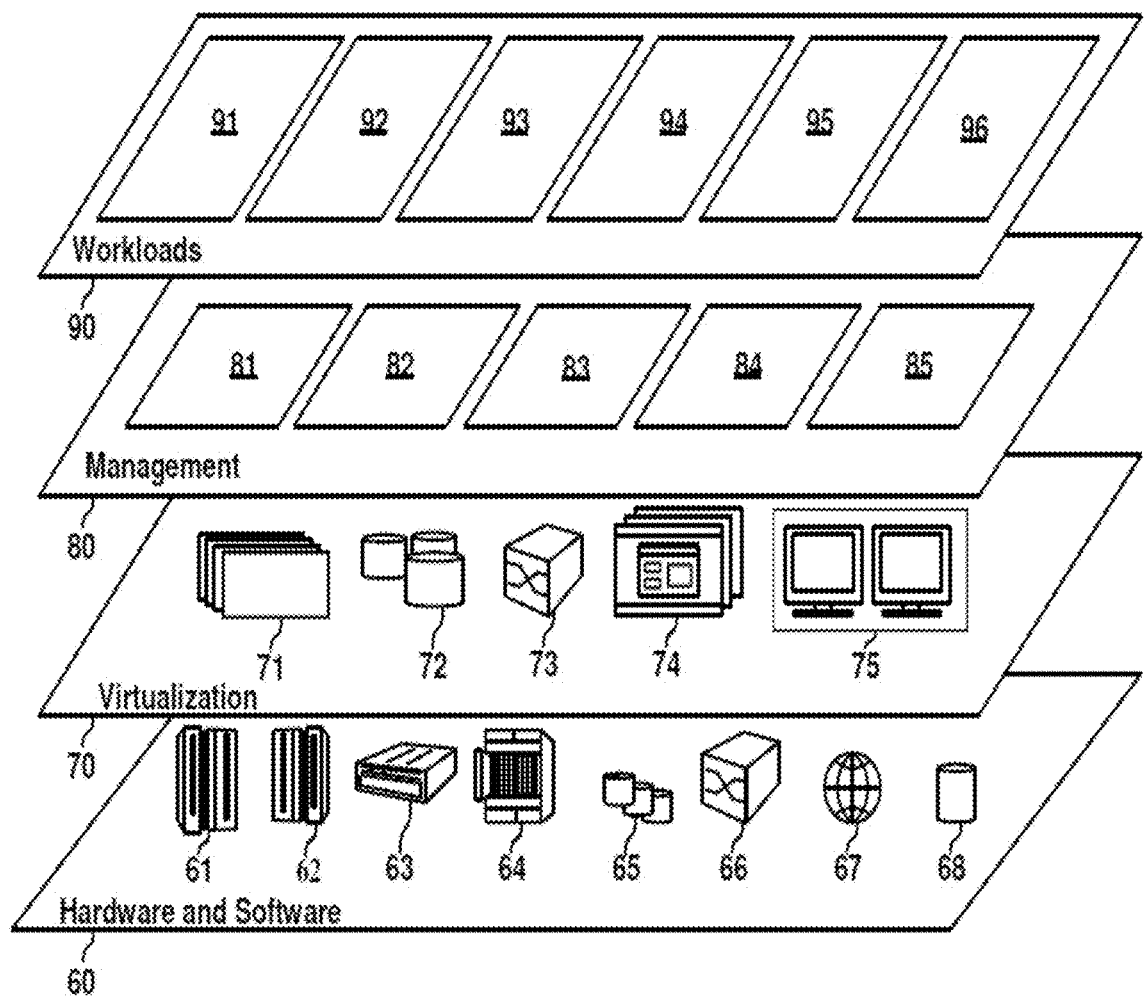
FIG. 9 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and active read-writable standby database creation 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating a standby database with read/write access capability while also maintaining a data consistency with a primary database, the method comprising:
    syncing, by a processor of a computing system, the primary database with a physical standby mirror existing on the standby database, wherein a first data object and a second data object written to the primary database from a live application is synced in a read only access on the physical standby mirror;
    creating, by the processor, a first data compartment and a second data compartment on the standby database, separate from the physical standby mirror;
    applying, by the processor, a change made to the first data object on the primary database to the corresponding first data object on the physical standby mirror; and
    determining, by the processor, that (i) the change should be applied to the corresponding first data object stored on the first data compartment in accordance with data merge rules associated with the first data compartment to keep the data stored on the first data compartment updated in real-time and in sync with the physical standby mirror, and (ii) the change should not be applied to the corresponding first data object stored on the second data compartment in accordance with data merge rules associated with the second data compartment.

2. The method of claim 1, wherein the data merge rules associated with the first data compartment and the second data compartment specify which objects, tablespaces, and schemas stored on the first data compartment and the second data compartment, respectively, should be filtered or excluded from being synchronized with the physical standby mirror to create a redo stream associated with each data compartment.

3. The method of claim 2, wherein the first data compartment and the second data compartment internally dequeues the redo stream in a sequential order and remaps object identifiers of the redo stream.

4. The method of claim 1, wherein the processor communicates with a transaction log stream that captures changes to data objects in the primary database to receive the change to the first data object on the primary database.

5. The method of claim 1, further comprising: receiving, by the processor, the change from a transaction log stream that captures changes to data objects in the primary database to receive the change to the first data object on the primary database.

6. The method of claim 1, wherein the first data compartment and the second data compartment are a read/write data compartment, further wherein the first data compartment is a static data compartment synchronized with the physical standby mirror, and the second data compartment is a divergent compartment that includes data that has diverged from the data on the physical standby mirror over a period of time.

7. The method of claim 1, wherein a reporting application accesses the first data compartment and the second data compartment which contains updated and real-time data objects, and creates a new temporary reporting data object on the first data compartment using the updated and real-time data.

8. The method of claim 1, further comprising: cloning, by the processor, a plurality of data objects to a third data compartment, in response to a request by a testing application to perform a cloning process, wherein the testing application reads a target data object from the third data compartment if the target data object has been successfully cloned on the third data compartment, and reads the target data object from the physical standby mirror if the target data object has yet to be successfully cloned to the third data compartment.

9. A computer system, comprising:
    a processor;
    a memory device coupled to the processor; and
    a computer readable storage device coupled to the processor, wherein the storage device contains program code executable by the processor via the memory device to implement a method for creating a standby database with read/write access capability while also maintaining a data consistency with a primary database, the method comprising:
        syncing, by a processor of a computing system, the primary database with a physical standby mirror existing on the standby database, wherein a first data object and a second data object written to the primary database from a live application is synced in a read only access on the physical standby mirror;
        creating, by the processor, a first data compartment and a second data compartment on the standby database, separate from the physical standby mirror;
        applying, by the processor, a change made to the first data object on the primary database to the corresponding first data object on the physical standby mirror; and determining, by the processor, that (i) the change should be applied to the corresponding first data object stored on the first data compartment in accordance with data merge rules associated with the first data compartment to keep the data stored on the first data compartment updated in real-time and in sync with the physical standby mirror, and (ii) the change should not be applied to the corresponding first data object stored on the second data compartment in accordance with data merge rules associated with the second data compartment.

10. The computer system of claim 9, wherein the data merge rules associated with the first data compartment and the second data compartment specify which objects, tablespaces, and schemas stored on the first data compartment and the second data compartment, respectively, should be filtered or excluded from being synchronized with the physical standby mirror to create a redo stream associated with each data compartment.

11. The computer system of claim 10, wherein the first data compartment and the second data compartment internally dequeues the redo stream in a sequential order and remaps object identifiers of the redo stream.

12. The computer system of claim 9, wherein the first data compartment and the second data compartment are a read/write data compartment, further wherein the first data compartment is a static data compartment synchronized with the physical standby mirror, and the second data compartment is a divergent compartment that includes data that has diverged from the data on the physical standby mirror over a period of time.

13. The computer system of claim 9, wherein a reporting application accesses the first data compartment and the second data compartment which contains updated and real-time data objects, and creates a new temporary reporting data object on the first data compartment using the updated and real-time data.

14. The computer system of claim 9, further comprising: cloning, by the processor, a plurality of data objects to a third data compartment, in response to a request by a testing application to perform a cloning process, wherein the testing application reads a target data object from the third data compartment if the target data object has been successfully cloned on the third data compartment, and reads the target data object from the physical standby mirror if the target data object has yet to be successfully cloned to the third data compartment.

15. A computer program product, comprising a computer readable hardware storage device storing a computer readable program code, the computer readable program code comprising an algorithm that when executed by a computer processor of a computing system implements a method for creating a standby database with read/write access capability while also maintaining a data consistency with a primary database, comprising:
    syncing, by a processor of a computing system, the primary database with a physical standby mirror existing on the standby database, wherein a first data object and a second data object written to the primary database from a live application is synced in a read only access on the physical standby mirror;
    creating, by the processor, a first data compartment and a second data compartment on the standby database, separate from the physical standby mirror;
    applying, by the processor, a change made to the first data object on the primary database to the corresponding first data object on the physical standby mirror; and
    determining, by the processor, that (i) the change should be applied to the corresponding first data object stored on the first data compartment in accordance with data merge rules associated with the first data compartment to keep the data stored on the first data compartment updated in real-time and in sync with the physical standby mirror, and (ii) the change should not be applied to the corresponding first data object stored on the second data compartment in accordance with data merge rules associated with the second data compartment.

16. The computer program product of claim 15, wherein the data merge rules associated with the first data compartment and the second data compartment specify which objects, tablespaces, and schemas stored on the first data compartment and the second data compartment, respectively, should be filtered or excluded from being synchronized with the physical standby mirror to create a redo stream associated with each data compartment.

17. The computer program product of claim 16, wherein the first data compartment and the second data compartment internally dequeues the redo stream in a sequential order and remaps object identifiers of the redo stream.

18. The computer program product of claim 15, wherein the first data compartment and the second data compartment are a read/write data compartment, further wherein the first data compartment is a static data compartment synchronized with the physical standby mirror, and the second data compartment is a divergent compartment that includes data that has diverged from the data on the physical standby mirror over a period of time.

19. The computer program product of claim 15, wherein a reporting application accesses the first data compartment and the second data compartment which contains updated and real-time data objects, and creates a new temporary reporting data object on the first data compartment using the updated and real-time data.

20. The computer program product of claim 15, further comprising: cloning, by the processor, a plurality of data objects to a third data compartment, in response to a request by a testing application to perform a cloning process, wherein the testing application reads a target data object from the third data compartment if the target data object has been successfully cloned on the third data compartment, and reads the target data object from the physical standby mirror if the target data object has yet to be successfully cloned to the third data compartment.

* * * * *